United States Patent
Korabiak

(10) Patent No.: US 6,243,008 B1
(45) Date of Patent: Jun. 5, 2001

(54) AUTOMOBILE REAR LIGHT WARNING DISPLAY

(76) Inventor: Walter Korabiak, 103 Crine Rd., Morganville, NJ (US) 07751

( * ) Notice: Subject to any disclaimer, the term of this patent is extended or adjusted under 35 U.S.C. 154(b) by 0 days.

(21) Appl. No.: 09/633,701
(22) Filed: Aug. 7, 2000
(51) Int. Cl.[7] ................................................ B60Q 1/22
(52) U.S. Cl. ........................... 340/463; 340/464; 340/479
(58) Field of Search .................................. 340/463, 464, 340/465, 466, 467, 468, 475, 477, 478, 479, 472

(56) References Cited

U.S. PATENT DOCUMENTS 4,983,953 * 1/1991 Page .................................... 340/467
5,119,067 * 6/1992 Adell ................................... 340/468
5,345,218 * 9/1994 Woods et al. ....................... 340/479

* cited by examiner

Primary Examiner—Jeffery Hofsass
Assistant Examiner—Daniel Previl
(74) Attorney, Agent, or Firm—Charles I. Brodsky

(57) ABSTRACT

In an automobile having at its back end left and right turn signal lights, left and right side tail lights, left and right side stop lights, left and right side back-up lights and a high mounted stop light substantially centered between left and right sides of the automobile, means are included to additionally pulse the high mounted stop light on-and-off at spaced time intervals as the vehicle drops in speed below a predetermined threshold, and, also, while stopped with its engine running. In one embodiment, the high mounted stop light, when pulsed, glows at a color different from the illumination of the tail lights and stop lights when energized.

6 Claims, 1 Drawing Sheet

AUTOMOBILE REAR LIGHT WARNING DISPLAY

FIELD OF THE INVENTION

This invention relates to the safety of automobile design, in general, and to increasing automobile safety through the design of its light warning displays, in particular.

BACKGROUND OF THE INVENTION

As is well known, and understood, recent years have witnessed many advances in the lighting displays of automobiles to enhance safety of operation. One such development, for example, concerns the automatic turning on of the car's head lights once the ignition is turned on and the vehicle put in gear, while a second adds lights to the back end of the automobile to illuminate when the car is shifted into reverse. A third advance adds a system of fog lights to the array of high and low beam head lights and parking lights at the front end of the car. Color coding is frequently also utilized to distinguish turn signal lights from tail and stop lights, for example, and a high mounted stop light has been added as a display at the rear windshield—commonly, at the eye level of the driver of a following vehicle. Thoughts have even been given to modifying the stop light construction in an attempt to distinguish a driver applying his/her brakes "hard", as in an emergency situation, as compared to tapping the brakes lightly or "soft", when just slowing down.

SUMMARY OF THE INVENTION

As will be appreciated, however, rear end automobile accidents continue to occur, oftentimes with devastating results. Illustrative of this was a recent reporting of a car being stopped before a railroad crossing, only to be struck from behind in a manner propelling it forward onto the tracks in the path of an oncoming freight train, resulting in the deaths of all occupants of the automobile.

In view of this, and as will become clear from a consideration of the following description, the present invention extends this area of light warning automotive safety by modifying the high mounted stop light construction to automatically pulse on-and-off at spaced time intervals once the vehicle's speed falls below a predetermined threshold. In accordance with a preferred embodiment, such display automatically pulses once the speed falls below 5 miles per hour—and continues even while the vehicle slows to a complete stop, as long as its engine continues running. Only when the automobile speeds up beyond such predetermined level does the high mounted stop light pulsing disappear. In other words, in the preferred embodiment of the invention, depressing the brake pedal produces the usual "red" stop light and high mounted stop light display, until the vehicle slows below 5 miles per hour, when the high mounted stop light display automatically is converted to its pulsing mode. In accordance with such preferred embodiment, the pulsing can be selected at a rate in excess of four (4) pulses per second, as providing a stroboscopic effect—while in a second embodiment, to call further attention to the slowing automobile, the strobing could be at a different color than the "red" displayed when applying the brakes at speeds above the threshold.

As will be appreciated, the overall effect is to call immediate attention to the driver of a following vehicle that the automobile equipped with the invention has slowed below the 5 mile per hour threshold, or below whatever threshold is selected by the automobile manufacturer, or has stopped—as, for example, at a traffic light. Analysis has shown that following drivers frequently become distracted and visualize a stop light as being nothing more than an additional taillight, misreading the information of the applied brake, and continuing forward. As will be readily appreciated then, the pulsing effect available with the high mounted stop light of the invention serves as an enhanced alternative to techniques used by some stopped drivers of tapping the brake to provide an alert to an oncoming vehicle that a full stop has, in fact, occurred.

BRIEF DESCRIPTION OF THE DRAWINGS

These and other features of the present invention will be more fully understood from a consideration of the following description, taken in connection with FIGS. 1 and 2 of the drawings, which illustrate the back end of a typical automobile incorporating a high mounted stop light display according to the invention.

DETAILED DESCRIPTION OF THE INVENTION

Figure 1:
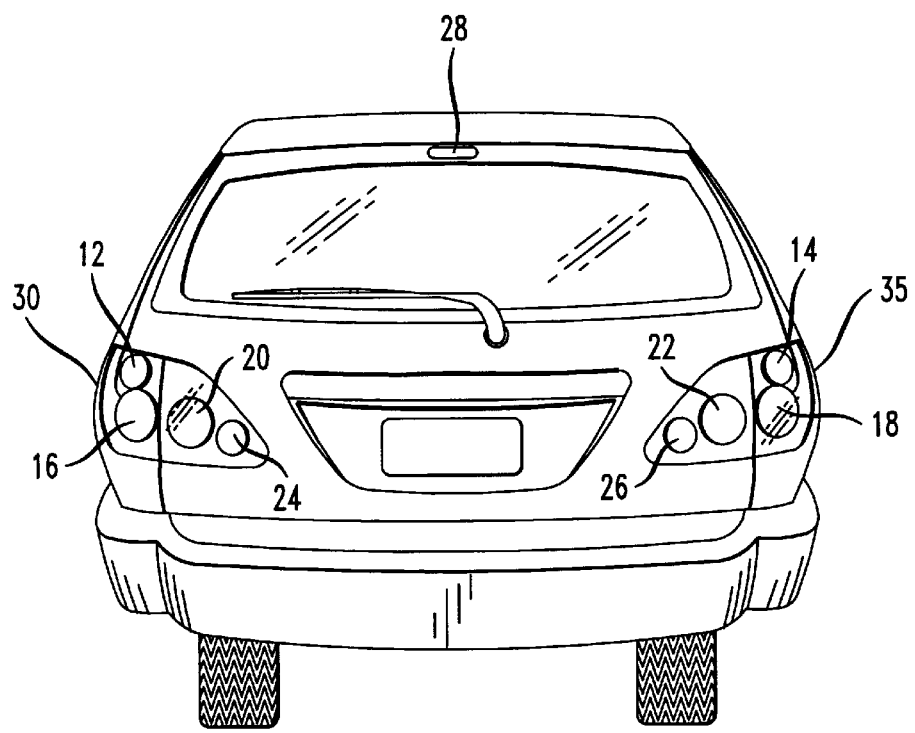
Figure 2:
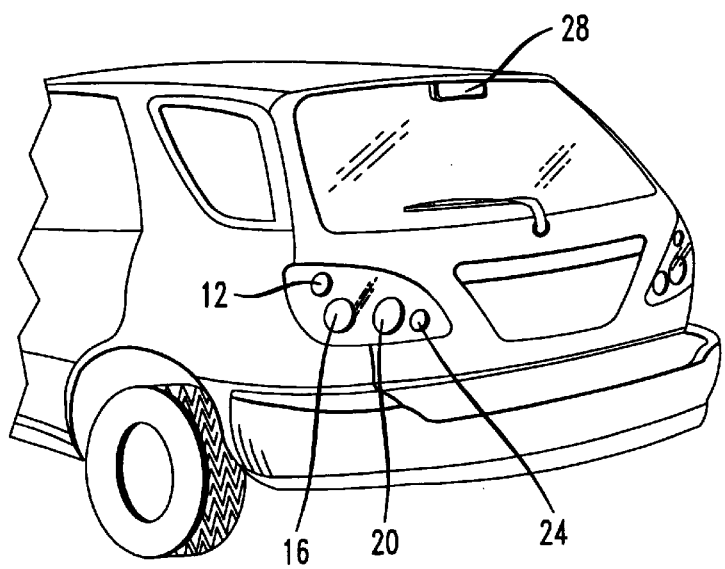

In the illustrative automobile of the FIGS. 1 and 2, its rear light warning display includes left and right turn signal lights 12, 14, left and right side tail lights 16, 18, and a further pair of left and right side stop lights 20, 22. Left and right side back-up lights are further included, shown as 24 and 26, respectively. To enhance discernment, the left and right turn signal lights 12, 14, illuminate yellow or orange, while the left and right side tail lights 16 and 18 and the stop lights 20 and 22 illuminate red. The left and right side back-up lights 24, 26 illuminate white—and the automobile design is such that when a driver applies his/her brakes, the tail lights 16 and 18, and the stop lights 20 and 22 brighten beyond their glow when the lights are just turned on, without the brake pedal being depressed. In one automobile construction, both the tail lights and stop lights operate simultaneously, while in another construction, they operate independently.

In accordance with recent automotive rear light warning display designs, a high mounted stop light 28 is further included, at the rear windshield, substantially centered between the left and right sides of the automobile—30, 35. As will be understood, in certain automotive manufactures, the high mounted stop light 28 is situated towards the top of the rear windshield (as shown in FIG. 1), while in other manufactures, the stop light 28 is situated near to the bottom of the rear windshield. As will also be understood, whether the stop light 28 is located high on the rear windshield or low on the rear windshield is often dictated by whether the automobile is equipped with a rear windshield wiper (as in FIG. 1), or not.

As will also be appreciated, typical operation of the automobile is one in which applying the brakes causes the high mounted stop light 28 to illuminate, as well as the tail lights 16 and 18 and the stop lights 20 and 22. Holding the foot on the brake while stopped then continues the illumination of the four tail lights and stop lights, and the high mounted stop light. This continues whether or not the left or right turn signal directional has been actuated.

However, and in accordance with the teachings of the present invention, while the different colorations for the tail lights 16 and 18 and for the stop lights 20 and 22 on the one hand may continue different from the colorations for the left and right turn signal lights 12 and 14 and from the left and right side back-up lights 24 and 26, the operation of the high mounted stop light 28 is changed. In particular, the design is such that tapping the brake at highway speeds continues its generally red glowing illumination—but devices are included in the automobile to sense its slowing to the extent that once the predetermined threshold is reached, the illumination of the high mounted stop light 28 automatically changes over to one which pulses on-and-off at spaced time intervals for as long as the vehicular speed continues below that threshold, even to the time when the car is stopped, as long as its engine continues to run. In accordance with the invention, only when the vehicular speed increases back above the predetermined threshold will the pulsations cease, and the high mounted stop light illumination extinguish, until the brakes are applied once again by the driver at the increased speed.

In a further embodiment of the invention, the predetermined threshold at which the pulsations commence is selected to be 5 miles per hour, with the pulses automatically coming at a rate in excess of 4 pulses per second. Investigation has revealed that the stroboscopic light effect thereby produced is of far greater effect in alerting a following driver of the slowing vehicle than one where the high mounted stop light just continues to glow at its conventional red coloration. In an additional embodiment of the invention, the stroboscopic pulsing effect can be heightened even more through a modification of the high mounted stop light such that the pulsations produce a different color light than the left and right tail lights and stop lights—or even a different color light than the high mounted stop light when coming on by the application of the brakes at speeds above the predetermined threshold. Analysis has shown that the increased effect heightens following driver awareness of the slowing automobile, and of its being stopped, to increase avoidance of rear end hits caused by driver distraction and/or lack of focus concentration.

While there has been described what is considered to be a preferred embodiment of the present invention, it will be readily appreciated by those skilled in the art that modifications can be made without departing from the scope of the teachings herein of pulsing the high mounted stop light as the automobile slows below a predetermined threshold. While a speed of 5 miles per hour has been described, for a pulse rate of 4 pulses per second, it will readily be seen that different pulse rates could be employed, and/or at different vehicular speed levels, to provide the increased warning indication, and whether or not the high mounted stop light illuminates then at the same or at a different color. In this regard, the pulse rate could be greater than 4 pulses per second, or less than that, as long as it is faster than any turn signal illumination—so as to be distinguishable therefrom. For at least such reason, therefore, resort should be had to the claims appended hereto for a complete understanding of the scope of the invention.

What is claimed is:

1. A rear light warning display at the back end of an automobile, comprising:

left and right turn signal lights;

left and right side tail lights;

left and right side stop lights;

left and right side back-up lights;

a high mounted stop light substantially centered between left and right sides of the automobile;

and means actuated by driver operation to illuminate various ones of said lights and said high mounted stop light, with said means being automatically operable to pulse said high mounted stop light on-and-off at spaced time intervals at vehicle speeds below a predetermined threshold.

2. The rear light warning display of claim 1 wherein said means is automatically operable to pulse said high mounted stop light on-and-off at vehicle speeds below 5 miles per hour.

3. The rear light warning display of claim 2 wherein said means is automatically operable to additionally pulse said high mounted stop light on-and-off when the automobile is stopped, but with its engine running.

4. The rear light warning display of claim 3 wherein said means is automatically operable to pulse said high mounted stop light on-and-off at a rate in excess of 4 pulses per second.

5. The rear light warning display of claim 3 wherein said means is automatically operable to pulse said high mounted stop light on-and-off at a color different from a color display of illuminated left and right side tail lights and stop lights.

6. The rear light warning display of claim 3 wherein said means is automatically operable to pulse said high mounted stop light on-and-off at a rate in excess of any rate of illumination of said left and right turn signal lights.

\* \* \* \* \*